United States Patent
Younggren et al.

(10) Patent No.: US 12,467,533 B2
(45) Date of Patent: Nov. 11, 2025

(54) HIGH-LOW SHIFTING ACTIVE TORQUE MANAGEMENT CONTINUOUSLY VARIABLE TRANSMISSION SYSTEM

(71) Applicant: TEAM Industries, Inc., Bagley, MN (US)

(72) Inventors: Bruce H. Younggren, Bemidji, MN (US); Jordan E. Fisk, Bemidji, MN (US); Michael Allen Mueller, Bemidji, MN (US); Brandon P. Lenk, Shevlin, MN (US); Daniel James Fullum, Bagley, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 18/919,758

(22) Filed: Oct. 18, 2024

(65) Prior Publication Data

US 2025/0129846 A1    Apr. 24, 2025

Related U.S. Application Data

(60) Provisional application No. 63/591,197, filed on Oct. 18, 2023.

(51) Int. Cl.
   *F16H 61/662*    (2006.01)
   *F16H 37/02*    (2006.01)
   (Continued)

(52) U.S. Cl.
   CPC ..... *F16H 61/66272* (2013.01); *F16H 37/022* (2013.01); *F16H 59/02* (2013.01);
   (Continued)

(58) Field of Classification Search
   CPC .. F16H 37/022; F16H 2037/026; F16H 59/02; F16H 59/14; F16H 2059/0221;
   (Continued)

(56) References Cited

U.S. PATENT DOCUMENTS

| 4,094,203 A | 6/1978 | van Deursen et al. |
| 4,475,416 A | 10/1984 | Underwood |

(Continued)

FOREIGN PATENT DOCUMENTS

| CA | 2456633 A1 | 7/2004 |
| EP | 0063786 A1 | 11/1982 |

(Continued)

*Primary Examiner* — Edwin A Young
(74) *Attorney, Agent, or Firm* — Fogg & Powers LLC

(57) ABSTRACT

A high-low shifting active torque management continuously variable transmission (CVT) system is provided. A primary pulley of a CVT is in operational communication with an engine. A high variable torque limiting clutch and a low variable torque limiting clutch selectively couple torque between a secondary pulley of the CVT and at least one drive axle of a vehicle when the vehicle when respectfully activated. The high variable torque limiting clutch and the low variable torque limiting clutch are configured to dynamically adjust a respective slippage threshold to above a then current output torque of the CVT and below a then current clamping force generated by the primary pulley and the secondary pulley on a torque connecting endless looped member of the CVT when respectfully activated.

20 Claims, 9 Drawing Sheets

(51) Int. Cl.
*F16H 59/02* (2006.01)
*F16H 59/14* (2006.01)
*F16H 61/66* (2006.01)

(52) U.S. Cl.
CPC ....... *F16H 59/14* (2013.01); *F16H 2037/026* (2013.01); *F16H 2059/0221* (2013.01); *F16H 2059/148* (2013.01); *F16H 2061/6618* (2013.01)

(58) Field of Classification Search
CPC ......... F16H 2059/148; F16H 61/66272; F16H 2061/6618
See application file for complete search history.

(56) References Cited

U.S. PATENT DOCUMENTS

| | | | |
|---|---|---|---|
| 4,583,423 A | 4/1986 | Hahne | |
| 4,699,259 A | 10/1987 | McColl | |
| 4,716,791 A | 1/1988 | Ohzono et al. | |
| 4,881,925 A | 11/1989 | Hattori | |
| 5,176,579 A | 1/1993 | Ohsono et al. | |
| 5,470,285 A | 11/1995 | Schneider et al. | |
| 5,568,853 A | 10/1996 | Adriaenssens | |
| 5,667,448 A | 9/1997 | Friedmann | |
| 5,690,576 A | 11/1997 | Moroto et al. | |
| 5,931,756 A | 8/1999 | Ohsono et al. | |
| 6,155,396 A | 12/2000 | Tsubata et al. | |
| 6,332,856 B1 | 12/2001 | Iwamoto | |
| 6,623,388 B1 | 9/2003 | Senger et al. | |
| 6,679,796 B2 | 1/2004 | Sugano | |
| 6,716,129 B2 | 4/2004 | Bott et al. | |
| 7,410,042 B2 | 8/2008 | Ochab et al. | |
| 8,002,653 B2 | 8/2011 | Shiozaki et al. | |
| 8,075,432 B2 | 12/2011 | Oishi et al. | |
| 8,147,370 B2 | 4/2012 | Nakajima et al. | |
| 8,298,119 B2 | 10/2012 | Jozaki et al. | |
| 9,371,896 B2 | 6/2016 | Kobayashi et al. | |
| 9,546,719 B2 | 1/2017 | Samie et al. | |
| 9,689,440 B2 | 6/2017 | Tsukuda et al. | |
| 9,989,146 B1* | 6/2018 | Abington | F16H 61/061 |
| 10,088,025 B2 | 10/2018 | Yamada et al. | |
| 10,240,667 B2 | 3/2019 | Walter | |
| 10,948,081 B2 | 3/2021 | Rippelmeyer et al. | |
| 11,485,225 B2 | 11/2022 | Younggren et al. | |
| 11,543,006 B2 | 1/2023 | Yudell et al. | |
| 2002/0173391 A1* | 11/2002 | Endo | B60K 6/543 |
| | | | 474/18 |
| 2004/0033851 A1 | 2/2004 | Lubben | |
| 2004/0058760 A1 | 3/2004 | Kuroda et al. | |
| 2004/0077444 A1 | 4/2004 | Kanda et al. | |
| 2004/0171443 A1 | 9/2004 | Borghi | |
| 2007/0144283 A1 | 6/2007 | Hasegawa et al. | |
| 2008/0268992 A1 | 10/2008 | Mitsubori et al. | |
| 2010/0167853 A1 | 7/2010 | Morita | |
| 2015/0345570 A1 | 12/2015 | Tsukuda et al. | |
| 2018/0252315 A1 | 9/2018 | Rippelmeyer et al. | |
| 2019/0195360 A1* | 6/2019 | Washio | F16H 61/0213 |
| 2019/0242473 A1 | 8/2019 | Hagihara | |
| 2020/0400221 A1 | 12/2020 | Yudell et al. | |
| 2021/0341039 A1 | 11/2021 | Kuroki | |

FOREIGN PATENT DOCUMENTS

| | | |
|---|---|---|
| EP | 184676 A | 6/1986 |
| EP | 0787927 A2 | 8/1997 |
| EP | 2275706 A1 | 1/2011 |

* cited by examiner

HIGH-LOW SHIFTING ACTIVE TORQUE MANAGEMENT CONTINUOUSLY VARIABLE TRANSMISSION SYSTEM

CROSS-REFERENCE TO RELATED APPLICATIONS

This Application claims priority to U.S. Provisional Application Ser. No. 63/591,197, same title herewith, filed on Oct. 18, 2023, which is incorporated in its entirety herein by reference.

BACKGROUND

A typical continuously variable transmission (CVT) includes a drive or primary pulley (or sheave) that is rotationally coupled to a motor and driven or secondary pulley (or sheave) that is rotationally coupled to a drivetrain. The drive and driven pulleys, sometimes referred to as a drive clutch and driven clutch of a CVT, are rotationally coupled to each other with the use of an endless looped member such as a belt. One type of belt is a steel belt. CVTs that use steel belts are capable of delivering a wide gear ratio range from a single device. This enables the engine to operate at peak efficiency or peak power at a wide range of vehicle speeds. However, it also means that the torque, that must be transmitted by the secondary pulley of a CVT, can range from a multiplier less than the peak engine torque to a multiplier greater than the peak engine torque. Moveable sheave members on the primary and secondary pulleys may be controlled with hydraulic pressure. The hydraulic clamp load and the running radius of the belt determine the torque that can be transmitted to the primary pulley before major slip occurs at the belt/sheave interface. This type of slip can be damaging to the CVT including steel belt CVTs (SBCVTs) and should be avoided. To prevent slip, the amount of hydraulic clamp load is typically a certain percentage above the point where the belt would slip.

SBCVTs are currently employed by the auto industry in passenger car applications. In these applications, torque spikes coming from the wheels are typically of low magnitude. The automotive industry is able to prevent slip due to these spikes, by over-clamping at the drive and driven pulleys, thus allowing the clutches to transmit the torque spikes without major slip.

In more strenuous applications, such as in trucks or off-road vehicles, torque spikes to the driveline from the wheels are more common. Torque spikes and reversals are caused by rough roads, rolling bumps and vehicle jumping activities. These spikes can be equal to several times the maximum wheel torque provided by the prime mover. Over-clamping to protect against spikes of this magnitude would lead to unacceptable drivetrain inefficiency due to friction losses between the pulleys and the belt and reduced life of the steel belt.

Further, off-road vehicles that implement a CVT, such as but not limited to, side-by-side vehicles, may include a gear box that provides a low gear and a high gear range. Selecting between the gear range may require current vehicles to be stopped when an operator of the vehicle uses an operator input to select the desired gear range used by the gear box.

For the reasons stated above and for other reasons stated below which will become apparent to those skilled in the art upon reading and understanding the present specification, there is a need in the art for a system that effectively and efficiently deals with torque spikes without affecting normal operation of the CVT, as well as a desire for a system to have the ability to shift from low gear range to high gear range, and from high gear range to low gear range without the need to bring the vehicle to a stop.

SUMMARY

The following summary is made by way of example and not by way of limitation. It is merely provided to aid the reader in understanding some of the aspects of the subject matter described. Embodiments provide a high-low shifting active torque management system that is positioned between a driven sheave of a CVT and wheel axles of a vehicle.

In one embodiment, a high-low shifting active torque management continuously variable transmission system is provided. The system includes a CVT, a high variable torque limiting clutch and a low variable torque limiting clutch. The CVT includes a primary pulley and a secondary pulley. The primary pulley is in operational communication with an engine to receive engine torque. The high variable torque limiting clutch selectively couples torque between the secondary pulley of the CVT and at least one drive axle of a vehicle when the vehicle is traveling in a high range. The high variable torque limiting clutch is configured to dynamically adjust a slippage threshold of the high variable torque limiting clutch to be above a then current output torque of the CVT and below a then current clamping force generated by the primary pulley and the secondary pulley on a torque connecting endless looped member of the CVT when the high variable torque limiting clutch is activated. The low variable torque limiting clutch selectively couples torque between the secondary pulley of the CVT and the at least one drive axle of the vehicle when the vehicle is traveling in a low range. The low range torque limiting clutch is configured to dynamically adjust a slippage threshold of the low range variable torque limiting clutch to be above the then current output torque of the CVT and below the then current clamping force generated by the primary pulley and the secondary pulley on the torque connecting endless looped member of the CVT when the low range variable torque limiting clutch is activated.

In another embodiment, a vehicle including an active torque management continuously variable transmission system is provided. The vehicle includes an engine to generate torque, a CVT, a high variable torque limiting clutch, and a low variable torque limiting clutch. The CVT includes a primary pulley, a secondary pulley and an endless looped member. The primary pulley is in operational communication with the engine to receive the torque generated by the engine. The endless looped member is engaged with the primary pulley and the secondary pulley to pass the torque between the primary pulley and the secondary pulley. The high variable torque limiting clutch selectively couples the torque between the secondary pulley of the CVT and at least one drive axle of a vehicle when the vehicle is traveling in a high range. The high variable torque limiting clutch is configured to dynamically adjust a slippage threshold of the high variable torque limiting clutch to be above a then current output torque of the CVT and below a then current clamping force generated by the primary pulley and the secondary pulley on the endless looped member when the high variable torque limiting clutch is activated. The low variable torque limiting clutch selectively couples the torque between the secondary pulley of the CVT and the at least one drive axle of the vehicle when the vehicle is traveling in a low range. The low variable torque limiting clutch is configured to dynamically adjust a slippage threshold of the low variable torque limiting clutch to be above the then current output torque of the CVT and below the then current clamping force generated by the primary pulley and the secondary pulley on the endless looped member when the low variable torque limiting clutch is activated.

In still another embodiment, a method of operating a high-low active torque management continuously variable transmission system is provided. The method includes determining a then current output torque of a continuously variable transmission (CVT); determining a then current clamp force of the CVT on an endless looped member; determining a slippage threshold that is less than the current clamp force and higher than the output torque of the CVT; and setting a slip torque of a high variable torque limiting clutch and a low variable torque limiting clutch that are positioned between the CVT and at least one drive axle of a vehicle based on the slippage threshold.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a high-low shifting active torque management continuously variable transmission (CVT) system. A high variable torque limiting clutch of the high-low shifting active torque management CVT system selectively couples torque between a secondary pulley of a CVT and at least one drive axle of a vehicle when the vehicle is traveling in a high range. The high variable torque limiting clutch is configured to dynamically adjust a torque slippage threshold of the high variable torque limiting clutch to be above a then current output torque of the CVT and below a then current clamping force generated by the primary pulley and the secondary pulley on a torque connecting endless looped member of the CVT when the high variable torque limiting clutch is activated.

The high-low shifting active torque management CVT system further includes, in an example, a low variable torque limiting clutch that selectively couples torque between the secondary pulley of the CVT and the at least one drive axel of the vehicle when the vehicle is traveling in a low range. The low range torque limiting clutch is configured to dynamically adjust a torque slippage threshold of the low range variable torque limiting clutch to be above the then current output torque of the CVT and below the then current clamping force generated by the primary pulley and the secondary pulley on the torque connecting endless looped member of the CVT when the low range variable torque limiting clutch is activated. Any slip caused by excessive torque occurs at one of the high variable torque limiting clutch and the low variable torque limiting clutch in embodiments.

Figure 1:
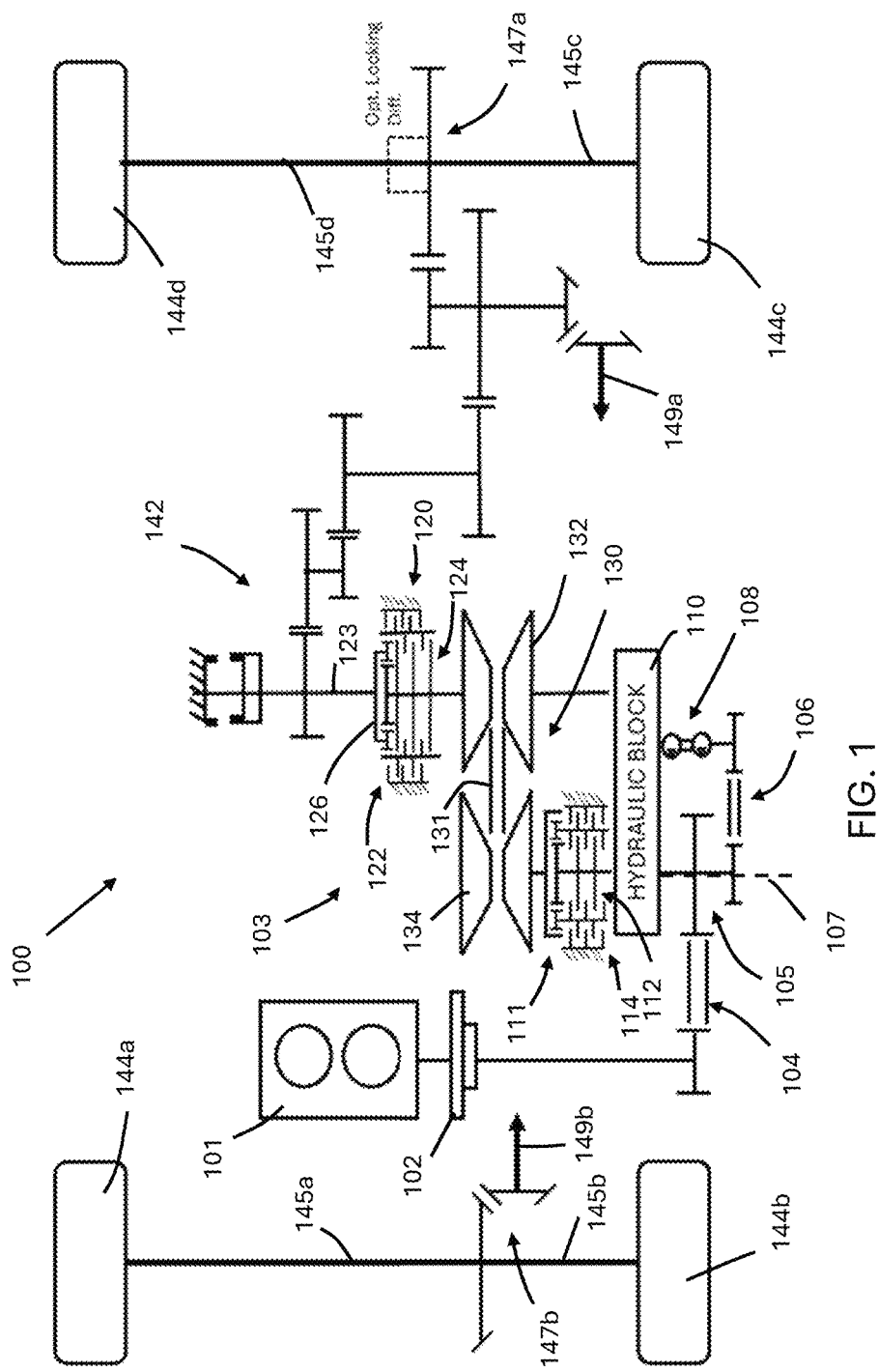
FIG. 1 is a block diagram of a vehicle including a high-low shifting active torque management continuously variable transmission system according to an example aspect of the present invention.

Referring to FIG. 1, a block diagram of a vehicle 100 that includes a high-low shifting active torque management CVT system 103 of one example is provided. Vehicle 100 includes an engine 101 (motor) to generate engine torque. Any type of motor that provides engine torque may be used including, but not limited to, an internal combustion engine (ICE) and an electric motor. The high-low shifting active torque management CVT system 103 includes a CVT 130 with a primary pulley 134 and a secondary pulley 132. Primary pulley 134 may be referred to as a drive sheave and the secondary pulley 132 may be referred to as a driven sheave. The primary pulley 134 of the CVT 130 is in operational communication with engine 101 to receive the engine torque. The high-low shifting active torque management CVT system 103 further includes a forward-reverse planetary gear set 111 and a high-low planetary gear set 120, a hydraulic block 110 or system, and a hydraulic pump 108. The forward-reverse planetary gear set 111 includes a forward-reverse clutch set that includes a reverse clutch 114 and a forward clutch 112 to selectively activate forward gearing or reverse gearing. The high-low gear set 120 includes a high-low clutch set that includes a low variable torque limiting clutch 122 and a high variable torque limiting clutch 124 to selectively activate low gearing or high gearing.

The active torque management CVT system 103 is operationally in communication with the engine 101 via flywheel/torque compensator 102 in this example. In an example that operates with high engine speeds, which may be upwards of 9000 revolutions per minute (RPM), a silent reduction member 104, which may include a chain in an example, may be used to slow down the primary pulley 134 of CVT 130. A sprocket 105 is positioned on a primary pulley axis 107 to deliver torque to the first planetary gear set 111.

An endless looped member 106, which may be a chain in an example, is also operationally coupled on the primary pulley axis 107 in this example. This endless looped member 106 drives hydraulic pump 108. Pump 108 may provide oil pressure to the active torque management CVT system 103 via the hydraulic block 110. The oil pressure may be used to selectively clamp clutches 112, 114, 122 and 124, selectively clamp a torque connecting endless looped member 131 of CVT 130, lubricate the CVT 130, supply oil to a cooler, etc. Examples of an endless looped member 131 is a belt, such as, but not limited to, a rubber belt and a steel belt.

Torque, generated by the engine 101, passes through the flywheel/torque compensator 102, through the reduction member 104, through the first planetary gear set 111, through the CVT 130, through the second planetary gear set 120, through a gearbox 142, through a drive axle 145a, 145b, 145c, and 145d to at least some of the wheels 144a, 144b, 144c, and 144d. The drive axles 145a, 145b, 145c and 145d in this example may be half shafts that are in operational communication with the gearbox 142. The drive axles 145a, 145b, 145c and 145b may be in operational communication with the gearbox 142 through differentials 147a and 147b, prop shafts 149a and 149b, etc. Differential 147a may be an optional locking differential.

Figure 2:
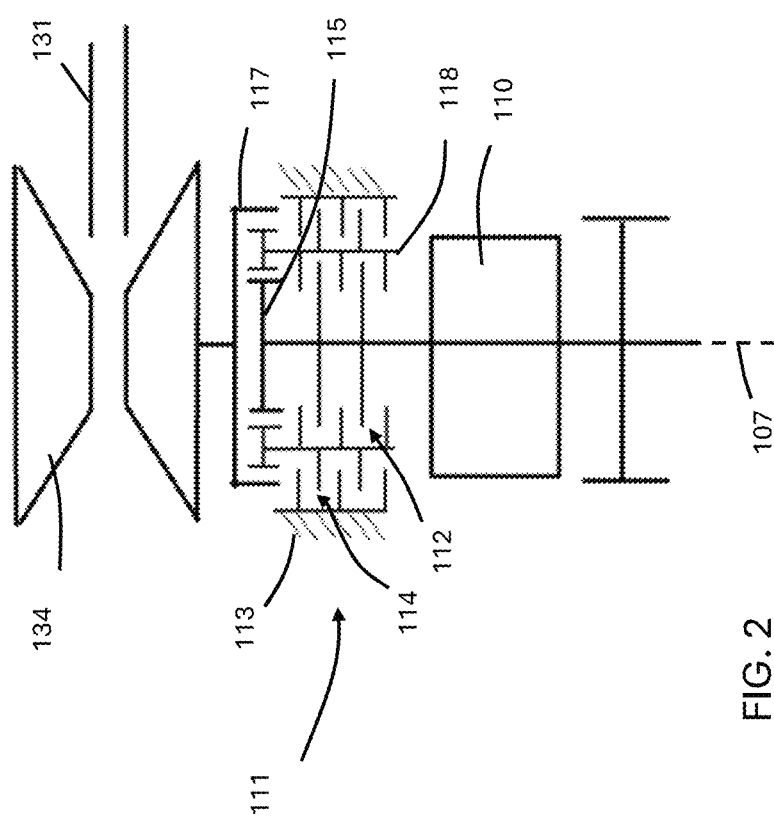
FIG. 2 is a block diagram of a forward-reverse clutch according to an example aspect of the present invention.

As discussed above, the first planetary gear set 111, which is positioned between the engine 101 and the CVT 130, includes a forward clutch 112 and a reverse clutch 114. When the forward clutch 114 is activated, torque comes in through a sun gear 115 as best illustrated in a partial close up view of the first planetary gear set 111 of FIG. 2. Forward clutch 112 locks a carrier 118 to the sun gear 115. The carrier 118 is operationally engaged with the primary pulley 134 of the CVT 130 through a ring gear 117. With the carrier 118 locked to the sun gear 115, this is a 1:1 ratio in this example.

In reverse, the reverse clutch 114 is activated. Activation of the reverse clutch 114 locks the carrier 118 to a ground 113 (a case). In reverse, the power (or torque) comes in through sun gear 115. Torque then passes through the ring gear 117 to the primary pulley 134 of the CVT 130. With carrier 118 locked to ground 113 and output through the ring gear 117, reverse rotation is achieved.

The forward clutch 112 and the reverse clutch 114 may be launch clutches used to take the vehicle 100 from idle/stop to moving. The forward clutch 112 and the reverse clutch 114 of the first planetary gear set 111 selectively transfers torque from the engine 101 through the CVT 130 and gearbox 142 to at least one wheel 144a, 144b, 144c and 144d of the vehicle.

Figure 3:
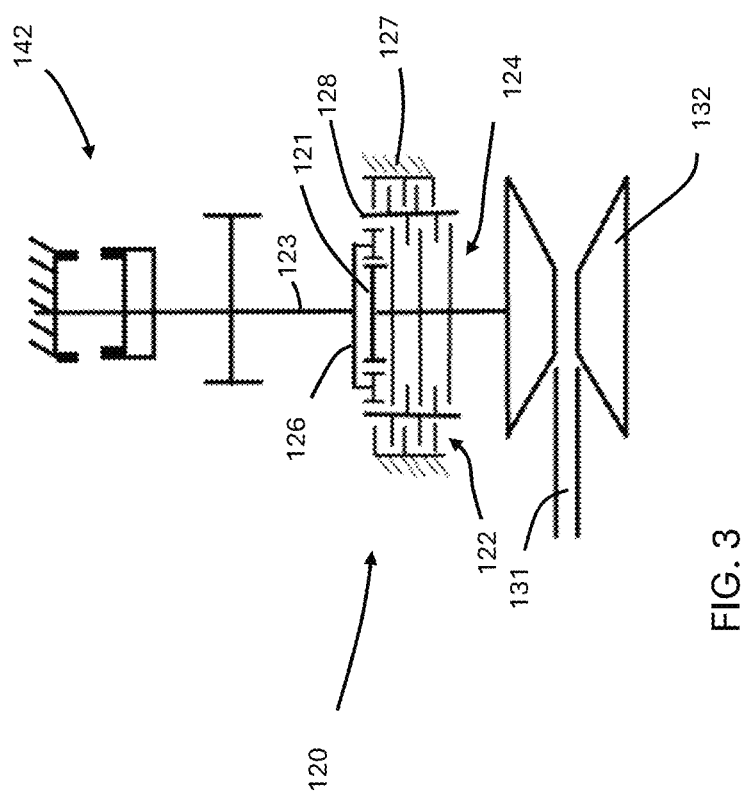
FIG. 3 is a block diagram of a high-low variable torque limiting clutch according to an example aspect of the present invention.

As further discussed above, the second planetary gear set 120, that is position between the CVT 130 and the gearbox 142, provides a high and low gear range for the vehicle 100. A close up view of the second planetary gear set 120 is illustrated in FIG. 3. High range is achieved by activating high variable torque limiting clutch 124. A sun gear 121 is operationally coupled to the secondary pulley 132 of the CVT 130. Torque comes in from the secondary pulley 132 to sun gear 121. When activated, the high variable torque limiting clutch 124 locks planetary ring gear 128 to sun gear 121. Torque is communicated through carrier 126 to an input shaft 123 to the gearbox 142. The high range is a 1:1 ratio in an example.

Low range is achieved by activating low variable torque limiting clutch 122. Torque comes in from the secondary pulley 132 of the CVT 130 which is attached to sun gear 121. When activated, the low variable torque limiting clutch 122 locks the planetary ring gear 128 to ground 127 (case) in this example. Output is through carrier 126 to the input shaft 123 of the gearbox 142. Low gear is a reduction of 2:1-3:1 in one example. In another example, the ratio may be dependent on the second planetary gear set 120.

The low variable torque limiting clutch 122 and the high variable torque limiting clutch 124 are used for engaging low or high range and shifting on the fly from low gear to high gear and high gear to low gear. This shift from high to low or low to high can be done with the vehicle moving or stationary in examples.

High variable torque limiting clutch 124 and low variable torque limiting clutch 122 have an additional function, in one example, that is not common to planetary/clutch sets in transmissions. Clutch packs of the high variable torque limiting clutch and the low variable torque limiting clutch 122 in examples serve two functions. The first function is to select high range or low range as described above. The second function is to act as an active torque management clutch (ATM) or peak/spike torque limiter.

CVT applications in the automotive industry are typically designed around the possibility of low torque spikes due to hitting potholes, going from ice to tar, etc. A CVT can be damaged if the belt slips relative to the pulley surfaces. To address this issue, CVTs that are typically designed for the automotive industry over clamp the drive and driven pulleys enough to allow torque transmission without major slip in the CVT due to torque spikes typically experienced in an automotive application. In off-road vehicles or trucks, torque spikes caused by rough roads and jumps create high torque spikes. These torque spikes can be equal to several times the maximum wheel torque provided by the prime mover. Over-clamping to protect against spikes of this magnitude may lead to unacceptable drivetrain inefficiency, and reduced belt life.

ATM clutches (the high variable torque limiting clutch 124 and the low variable torque limiting clutch 122) described herein serve to activate either high or low range, allowing to shift gears on the fly while moving down a trail while also to mitigate the torque spikes coming from the tires so the CVT 130 does not slip. In an embodiment, a high valve in a high fluid path to the high variable torque limiting clutch and a low valve in a low fluid path to the low variable torque limiting clutch are manipulated to accomplish a shift on the fly between a low range and a high range and vice versa.

The above explains how high variable torque limiting clutch 124 engages to active high range, high variable torque limiting clutch 124 is also used as an active torque management (ATM) clutch. Likewise, low variable torque limiting clutch 122 engages to active low range but is also used as an active torque management (ATM) clutch as described below.

RPM and output torque may be monitored in current engine systems. Using the RPM and output torque of engine 101, the torque and RPM in the primary pulley 134 of the CVT 130 is known. Through sensors 708 (illustrated in FIG. 7), how fast (the RPM) the secondary pulley 132 is spinning is also known, so a then current ratio of the CVT 130 is known. Knowing the current ratio, the torque at the output of the secondary pulley 132 can be determined. This information is used to know how hard to clamp the primary pulley 134 and the secondary pulley 132 pulleys onto the endless looped member 131 to not allow the endless looped member 131 to slip. Further, knowing the coefficient of friction between the belt and pulley surfaces, it is known how much oil pressure is needed to create the needed force to clamp the pulleys. In one example, coefficient of friction is stored in memory, such as memory 704 discussed below.

In embodiments, a torque slippage threshold of the ATM clutches (the high variable torque limiting clutch 124 and the low variable torque limiting clutch 122) is set to be above a then current output torque of the CVT 130 and below a then current clamping force generated by the primary pulley 134 and the secondary pulley 132 on the torque connecting endless looped member 131 of the CVT 130 when the ATM clutch is activated.

For example, if the primary and the secondary pulleys 134 and 132 of the CVT 130 are over clamped by 50% over the output torque of the CVT 130 and the clutch plates of the ATM clutches (the high variable torque limiting clutch 124 and the low variable torque limiting clutch 122) are set to slip at 25% over the output torque of the CVT 130, the ATM clutch (the high variable torque limiting clutch 124 or the low variable torque limiting clutch 122) will slip before the endless looped member 131 slips. This is because the clutch plates in ATM clutch (the high variable torque limiting clutch 124 or the low variable torque limiting clutch 122) are clamped to pass a lower torque than the CVT 130.

Further, it is desired to have the clamping force of the CVT 130 to be above an output torque the CVT 130. For example, if the CVT output torque is at 100 Nm, the clamping force of the CVT 130 on the endless looped member 131 may be for example at 50% more force or 150 Nm. This way the endless looped member 131 will not slip in the CVT 130. A clutch plate slippage threshold for clutch packs of the high and low variable torque limiting clutches 124 and 122 may be set for example, at 25% higher than the output torque of the CVT 130. So in this example, the slippage threshold of the high variable torque limiting clutch 124 (or low variable torque limiting clutch 122) will be set at 125 Nm. That way if a transient torque spike, say from the vehicle landing from a jump, the variable torque limiting clutch (the high variable torque limiting clutch 124 and the low variable torque limiting clutch 122) will slip at 125 Nm (at the set slippage threshold) while the endless looped member 131 of the CVT will not slip (which is set at 150 Nm.) Likewise, if the CVT output torque was at 200 Nm, the endless looped member 131 of the CVT 130 may be clamped to 300 Nm and the slippage threshold of the high or low variable torque limiting clutch 124 and 122 may be set at 250 Nm. The slippage threshold of the variable torque limiting clutch (high variable torque limiting clutch 124 and low variable torque limiting clutch 122) is set at a desired amount above the output torque of the CVT 130 and below the clamp torque of the CVT 130. This may be percentage based or it can be a set amount, for example 50 Nm, or it can be a combination of a set amount and a percentage above or below a certain threshold. The percentages discussed above, are merely examples, the percentages may be any value desired as long as the slippage threshold of the high variable torque limiting clutch 124 and the low variable torque limiting clutch 122 is above the output torque of the CVT 130 and below the clamp force on the endless looped member 131 provided by the primary and secondary pulleys 134 and 132 of the CVT 130.

The high variable torque limiting clutch 124 and the low variable torque limiting clutch 122 are capable of providing for shifting on the fly from high to low or low to high in an example. If starting in low range wanting to shift to high range, a prescribed function, which may be stored in a memory and implemented by a controller (such as memory 704 and controller 702 discussed below) will occur to open clutches, change engine RPM, change CVT ratio and change the engaged clutch from low to high range. Likewise coming down in speed if the driver wants to shift from high range to low range a prescribed function will occur to open clutches, change engine RPM, change CVT ratio and change the engaged clutch (the high variable torque limiting clutch 124 and the low variable torque limiting clutch 122) from high to low range. There may be more or less variables in this shift strategy, but a shift strategy of some type will be employed to do the shift while the vehicle is moving. Further in an example, the shift can occur when the vehicle is stationary.

Embodiments above describe the use of planetary clutch sets. Other embodiments may use a different driver than a sun gear that would lead to a different planetary set that would work similar to what has been described. Further, a compound planetary or other alignment of gears would result in a layout that may also be used.

Figure 4:
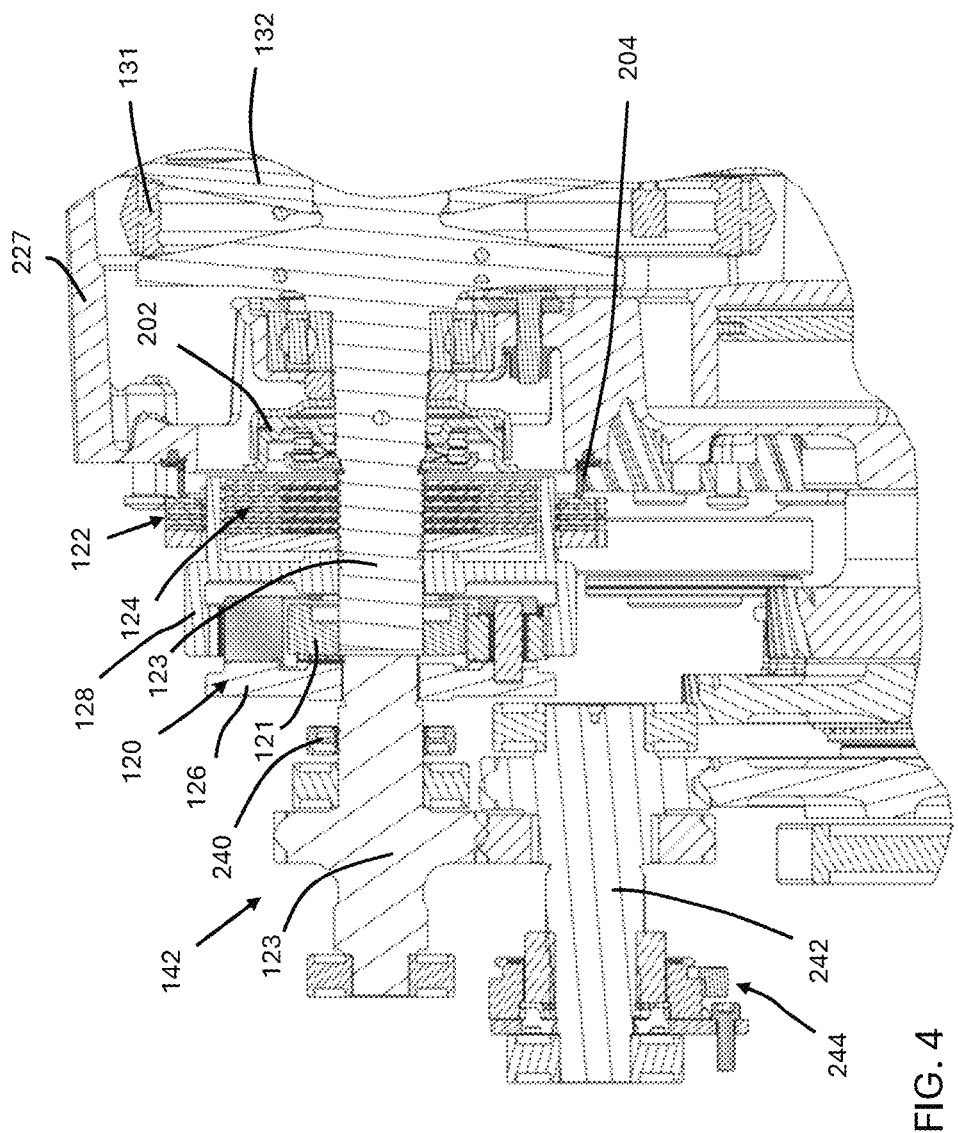
FIG. 4 is a partial cross-sectional side view of an active torque management continuously variable transmission system according to one example embodiment.
Figure 5:
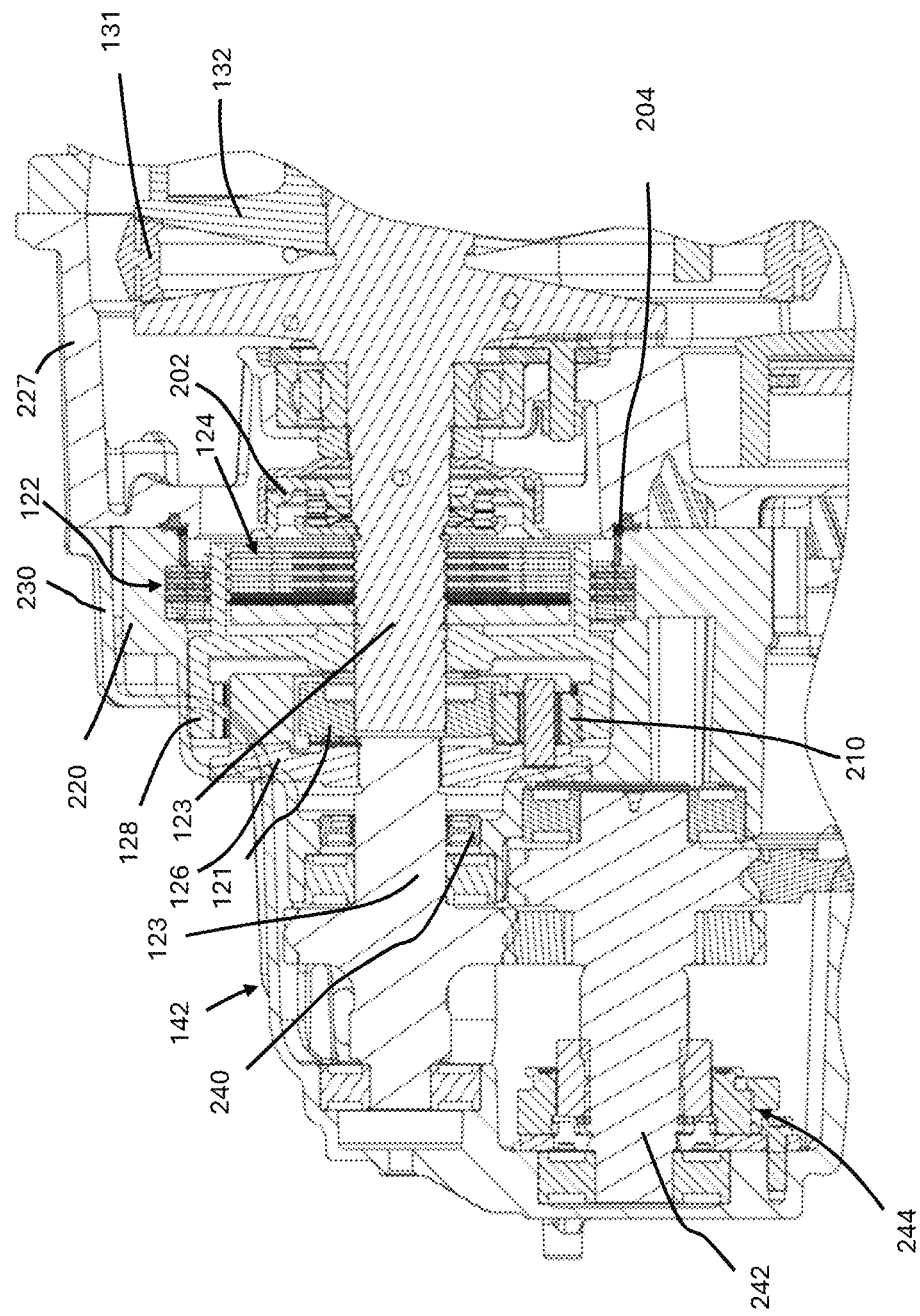
FIG. 5 is a partial cross-sectional front view of the active torque management continuously variable transmission system according to one example embodiment.

Further, FIG. 4 illustrates a partial cross-sectional side view of a high-low active torque management continuously variable transmission system according to one example embodiment. Illustrated is the input shaft 123 of the secondary pulley 132 that is operationally engaged with the gearbox 142. FIG. 4 illustrates CVT case 227 which includes CVT 130. FIG. 5 illustrates another partial cross-sectional side view of a high-low active torque management continuously variable transmission system according to one example embodiment including a gearbox case 230.

A high variable torque limiting clutch piston 202 is used to selectively engage the high variable torque limiting clutch 124 to activate the high variable torque limiting clutch 124. In an example, hydraulic fluid is directed in a fluid path by the hydraulic block 110 (system) to cause the high variable torque limiting clutch piston 202 to exert a force on high gear clutch plates of the high variable torque limiting clutch 124. The high gear clutch plates include a first set of high gear clutch plates coupled to the input shaft 123 and a second set of high gear clutch plates that are coupled to the planetary ring gear 128. The first set and second set of high gear clutch plates are alternatively staggered and adjacent with each other. This force allows torque to pass between the input shaft 123 and the planetary ring gear 128 by forcing the first and second sets of staggered high gear clutch plates into each other so they are locked together. This locks the planetary ring gear 128 to sun gear 121 in the high gear configuration. Torque passes from planetary ring gear 128 to the sun gear 121 via planetary planets 210.

In a low gear configuration, the low variable torque limiting clutch 122 is activated with a low variable torque limiting clutch piston 204. In an example, hydraulic fluid is directed in a fluid path by the hydraulic block 110 (system) to cause the low variable torque limiting clutch piston 204 to exert a force on low gear clutch plates of the low variable torque limiting clutch 122. The low gear clutch plates include a first set of low gear clutch plates coupled to the gearbox case 220, as best illustrated in FIG. 5, and a second set of low gear clutch plates that are coupled to the planetary ring gear 128. The first set and second set of low gear clutch plates are alternatively staggered between each other. The force provided by the low variable torque limiting clutch piston 204 locks the planetary ring gear 128 to ground (the gearbox case 220). Torque transfer in the low gear configuration is through sun gear 121 to the carrier 126 to a gearbox input shaft 123. As discussed above, low gear may be a reduction of 2:1-3:1 or any ratio since the ratio may depend on the high-low planetary gear set 120.

Further illustrated in FIGS. 4 and 5 is seal 240 that is mounted around the gearbox input shaft 123 and is located between the high-low planetary gear set 120 and gearing in the gearbox 142. The gearbox 142 in this example, includes a gearbox counter shaft 242 and a park mechanism 244.

Figure 6:
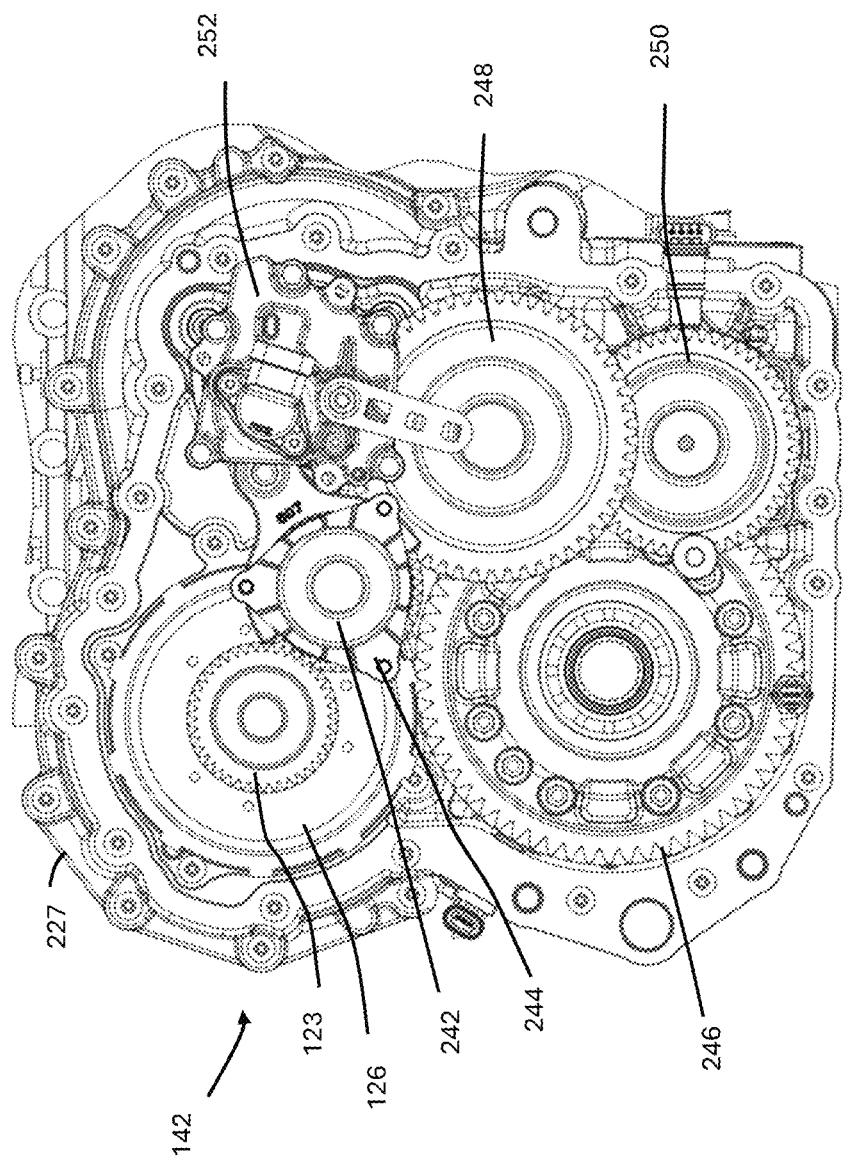
FIG. 6 is an end view of an active torque management continuously variable transmission system according to one example embodiment.

FIG. 6 is an end view of gearbox 142 without the gearbox case 220 in a high-low active torque management CVT system according to one example embodiment. The gearbox 142 is further illustrated as including an output gear 246, a stage two gear/shaft 248 and a stage three gear/shaft 250. A gearbox shifting mechanism 252 that includes a gear position sensor is used to shift gearing of gearbox 142.

Figure 7:
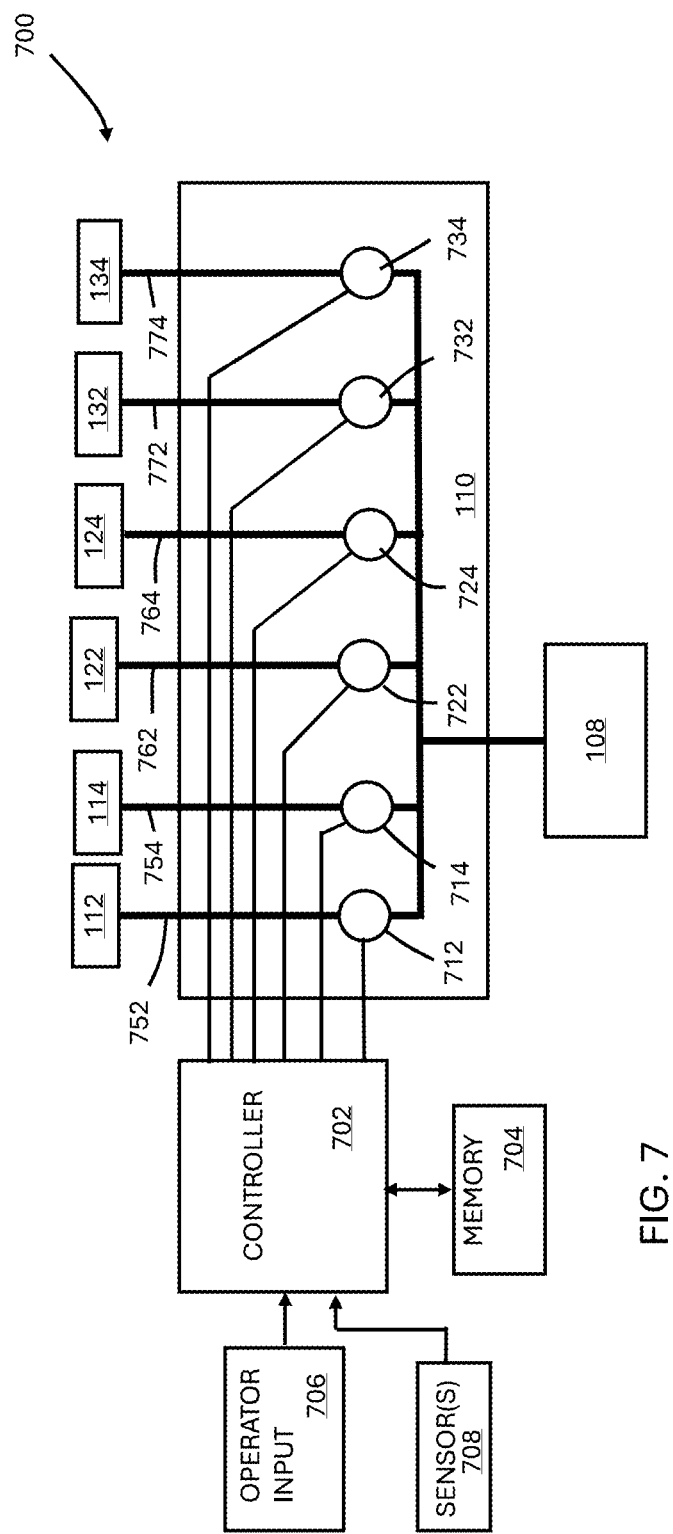
FIG. 7 illustrates a control system of a high-low shifting active torque management continuously variable transmission system according to one example embodiment.

FIG. 7 illustrates a block diagram of an example control system 700 of the high-low shifting active torque management CVT system 103 in an embodiment. The control system 700 in this example includes a controller 702, a memory 704 and an operator input 706. The controller 702 controls hydraulic valves in fluid paths in the hydraulic block 110.

In general, the controller 702 may include any one or more of a processor, microprocessor, a digital signal processor (DSP), an application specific integrated circuit (ASIC), a field program gate array (FPGA), or equivalent discrete or integrated logic circuitry. In some example embodiments, controller may include multiple components, such as any combination of one or more microprocessors, one or more controllers, one or more DSPs, one or more ASICs, one or more FPGAs, as well as other discrete or integrated logic circuitry. The functions attributed to controller 702 herein may be embodied as software, firmware, hardware or any combination thereof. Controller 702 may be part of a system controller or a component controller such as, but not limited to, a transmission control unit (TCU). Memory 704 may include computer-readable operating instructions that, when executed by controller 702, provide functions of the control system 700. Such functions may include the functions of manipulating or controlling valves to activate select clutches described below. The computer readable instructions may be encoded within memory 704. Memory 704 is an appropriate non-transitory storage medium or media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

The controller 702 is in communication with the operator input 706. The operator input 706 provides a vehicle operator an input to select forward, reverse, low gear, high gear, neutral, park, etc. The operator input 706 may be one or more switches which allow the vehicle operator to select a desired operation mode of the vehicle 100 such as forward, reverse, low gear, high gear, neutral and park. The controller 702 may also be in communication with one or more sensors 708, such as speed sensors, directional sensors, RPM sensors, acceleration sensors, position sensors, etc., relating to the vehicle and vehicle components.

The controller 702, implementing instructions stored in memory 704, operator input signals from the operator input 706, and, in an example, sensor signals from sensors 708 selectively control valves to selectively activate the clutches. For example, forward valve 712 may be opened by the controller 702 to allow hydraulic pressure, from the hydraulic pump to pass through a forward path 752 and activate the forward clutch 112 of the first planetary gear set 111. Reverse valve 714 may be opened by the controller 702 to allow hydraulic pressure, from the hydraulic pump to pass through a reverse path 754 and activate the reverse clutch 114 of the first planetary gear set 111. Low valve 722 may be opened by the controller 702 to allow hydraulic pressure, from the hydraulic pump to pass through a low path 762 and activate the low variable torque limiting clutch 122 of the second planetary gear set 120. High valve 724 may be opened by the controller 702 to allow hydraulic pressure, from the hydraulic pump to pass through a high path 764 and activate the high variable torque limiting clutch 124 of the second planetary gear set 120.

In an example, the vehicle operator may use the operator input 706, such as a gear selector, to select a gear (high, low, forward, reverse, neutral, park). For high, low, neutral, forward, reverse and park, a selection signal generated by the operator input 706 is communicated to the controller 702. The controller, based on the operating instructions saved in memory 704 determines which valves to open and close to achieve the selected gear. For example, if forward and high is selected, the controller 702 will open high valve 724 to close high variable torque limiting clutch 124 and then open forward valve 712 to close forward clutch 112 at a predetermined rate to engage that forward clutch 112 and start propelling the vehicle 100 forward (launch clutch). If low was selected the controller 702 will open low valve 722 to close low variable torque limiting clutch 122 first then open the forward valve 712 to close forward clutch 112 (forward launch clutch) at a predetermined rate to engage the forward clutch 112 and start propelling the vehicle forward.

In reverse, high variable torque limiting clutch or low variable torque limiting clutch may be engaged for reverse based off driving requirements. In one example, the high variable torque limiting clutch 124 is engaged because of the gear reduction in the first clutch planetary system 111. The reverse clutch 124 is then engaged to propel the vehicle backwards. In neutral, all of the valves 712, 714, 722 and 724 are closed so all four clutches 112, 114, 122, and 124 are open. In one example, if park is selected, an electrically activated park or a mechanically activated park, such as park mechanism 244 discussed above is used. Park mechanism 244 is positioned in the driveline after all of the four clutches 112, 114, 122 and 124 in an example.

The control system 700 of the high-low shifting active torque management CVT system 103, may also include the control of the clamping force applied to the endless looped member 131 by the primary pulley 134 and the secondary pulley 132 of the CVT 130. As illustrated in FIG. 7, controller 702 is in operational communication with a secondary valve 732 to apply a select amount of hydraulic pressure through a secondary path 772 to the secondary pulley 132 to achieve a desired clamping force on the endless looped member 131. Likewise, the controller 702 is in operational communication with a primary valve 734 to apply a select amount of hydraulic pressure though a primary path 774 to the primary pulley 134 to achieve a desired clamping force on the endless looped member 131. The desired clamping force provided by the primary pulley 134 and the secondary pulley 132 may be dependent on a current output torque provided the CVT 130 and a known coefficient of friction between the endless looped member 131 and pulley surfaces of the primary pulley 134 and the secondary pulley 132 of the CVT 130.

As discussed above, a slippage threshold of the engaged high variable torque limiting clutch 124 or the low variable torque limiting clutch 122, is adjusted to be between a then current output torque of the CVT 130 and a then current clamping force of primary and secondary pulleys 134 and 132 on the endless looped member 131 so that torque spikes are absorbed (addressed by slippage) in the high variable torque limiting clutch 124 or the low variable torque limiting clutch 122 instead of the CVT 130. In one example, the controller 702, dynamically adjusts the slippage threshold of the high variable torque limiting clutch 124 or low variable torque limiting clutch 122 (depending on which gear range is currently being used by the vehicle 100) to be between the current output torque of the CVT 130 and the current clamping force provided by the primary and secondary pulleys 134 and 132 of the CVT 130.

Figure 8:
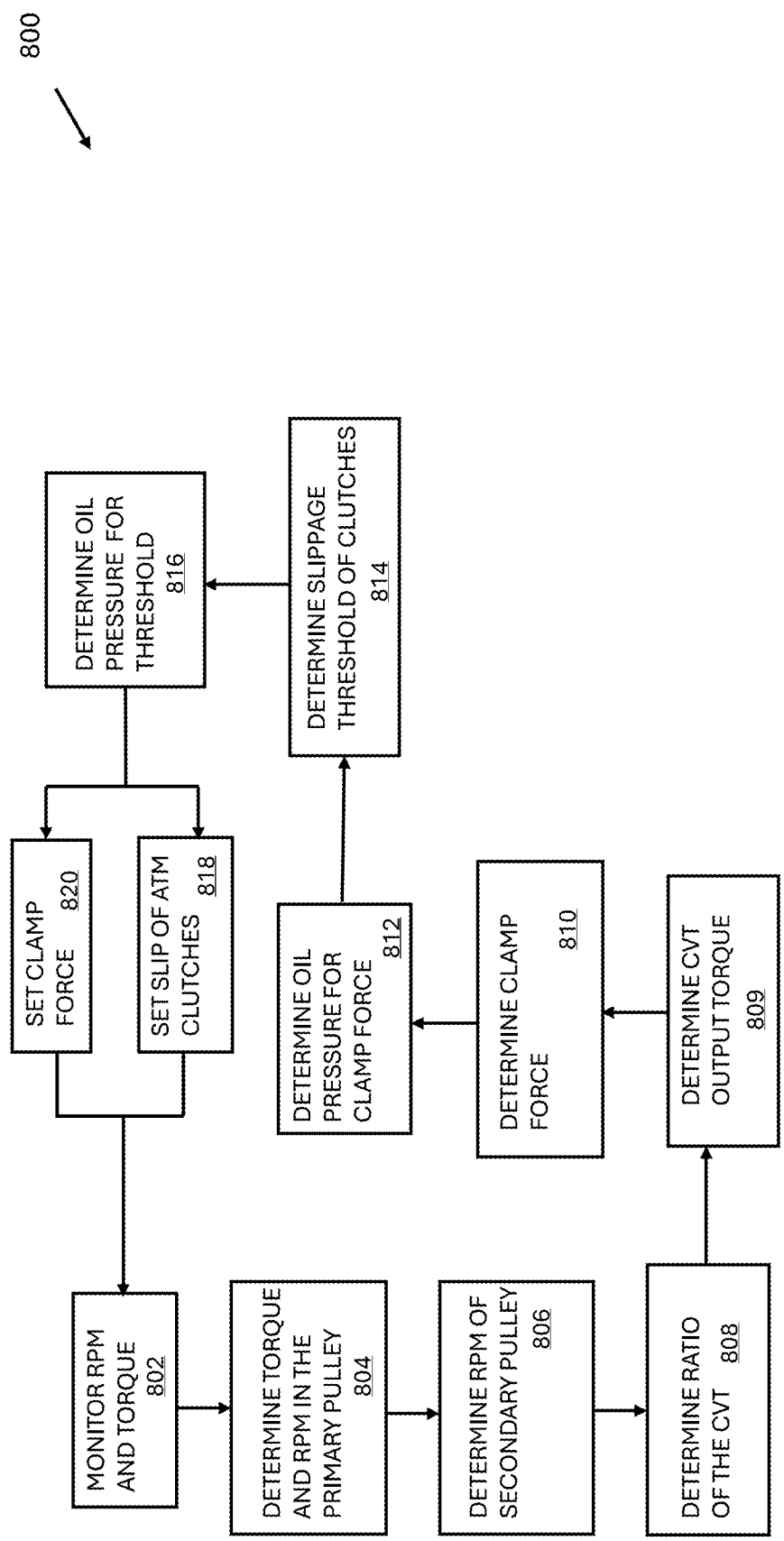
FIG. 8 illustrates a slippage threshold setting flow diagram according to one example embodiment.

A method of setting the slippage threshold of the high variable torque limiting clutch 124 or low variable torque limiting clutch 122 is provided in the slippage threshold setting flow diagram 800 of FIG. 8. In an example, the controller 702 implementing operating instructions stored in the memory 704 may accomplish the blocks set out in the slippage threshold setting flow diagram 800. The slippage threshold setting flow diagram 800 is provided as a series of blocks. The sequence of blocks may occur in a different order or even in parallel in other embodiments. Hence the present invention is not limited to the sequential sequence of blocks of FIG. 8.

At block 802 of the clamp torque setting flow diagram 800, the RPM and torque at an output of the engine 101 is determined. In one example, this is done with one or more sensors 708. Using the engine output RPM and torque, the torque and RPM at the primary pulley 134 of CVT 130 is determined at block 804. The RPM of the secondary pulley 132 is determined at block 806. This may be done with a sensor 708. Knowing the RPM of the primary pulley 134 and the secondary pulley 132 of the CVT 130, a current pulley ratio of the CVT 130 is determined at block 808. The torque at an output of the secondary pulley 132 of the CVT 130 is then determined at block 809 based on the current pulley ratio of the CVT 130.

At block 810, a clamp force at the primary pulley 134 and the secondary pulley 132, that is needed to prevent the endless looped member 131 from slipping, is determined. The determination of the CVT clamp force in this example is based on the torque at the output of the CVT 130 and known coefficients of friction between the endless looped member 131 and pulley surfaces. The oil pressure needed to achieve the CVT clamping force provided by the primary pulley 134 and the secondary pulley 132 is determined at block 812.

The slippage threshold for the low variable torque limiting clutch 122 and the high variable torque limiting clutch 124 is determined at block 814. As discussed above, the slippage threshold is positioned below the clamping force of the CVT 130 and above the output torque of the CVT 130. The oil pressure needed to set the slippage threshold in the low variable torque limiting clutch 122 and the high variable torque limiting clutch 124 is determined at block 816.

At block 818 the slip torque of the clutches (low variable torque limiting clutch 112 or high variable torque limiting clutch 124) is set using the determined oil pressure for the slippage threshold. This is done by manipulating the associated low valve 722 or high valve 724 to generate the desired hydraulic pressure that exerts a force on the respective low variable torque limiting clutch piston 204 or high variable torque limiting clutch piston 202 to set the slippage threshold (i.e., regulate the hydraulic pressure to set the desired slippage threshold). At block 820 the clamp force provided by the primary pulley 134 and the secondary pulley 132 on the endless looped member 131 is set by applying the determined hydraulic pressure on the primary pulley 134 and the secondary pulley 132 to clamp down on the endless looped member. The process then continues at block 802 monitoring for output engine RPM and torque.

Figure 9:
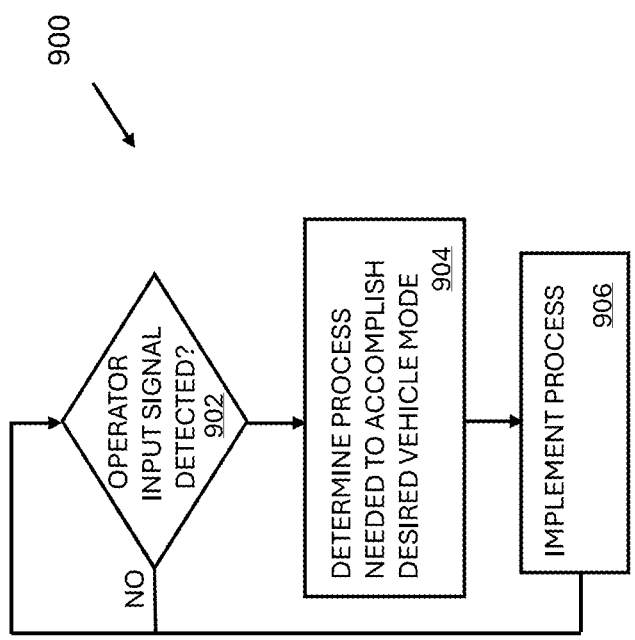
FIG. 9 illustrates a vehicle operation flow diagram according to one example embodiment.

A method of operating a vehicle is provided in vehicle operation flow diagram 900 of FIG. 9. In an example, the controller 702 implementing operating instructions stored in the memory 704 may accomplish the blocks set out in the vehicle operation flow diagram 900. The clamp torque setting flow diagram 900 is provided as a series of blocks. The sequence of blocks may occur in a different order or even in parallel in other embodiments. Hence the present invention is not limited to the sequential sequence of blocks of FIG. 9.

At block 902 it is determined if an operator signal has been detected. An operator signal may be generated when the vehicle operator selects a desired operation mode, such as forward, reverse, neutral, park, low range and high range. If an operator signal has not been detected, the process continues at block 902 monitoring if an operator signal has been detected.

If it is determined at block 902 an operator signal has been detected, a process needed to accomplish the desired vehicle mode indicated by the operator input signal is determined at block 904. With at least some of the operating modes, this is done with controller 702 implementing instructions stored in memory 704 and sensor information. For example, if the operator input signal indicates the vehicle is to be put in a neutral mode, valves 712, 714, 722 and 724 may be all closed (or at least valves 722 and 724) so their associated clutches are opened and there is no torque transfer through the opened clutches. Further for example, if the operator input signals indicates the vehicle should be in a forward mode and high mode, the forward valve is opened to close the forward clutch 112 while the reverse valve 714 is closed to open the reverse clutch 114. Further, the low valve 722 is closed to open the low variable torque limiting clutch 122 and the high valve 724 is at least partially opened to close the high variable torque limiting clutch 124. The high valve 714 is opened just enough to set the slippage threshold below the clamping force of the CVT 130 and above the output torque of the CVT 130. Further in an example, the high valve 724 and low valve 722 are manipulated (opened and closed) by the controller 702 implementing stored instructions in the memory 108 (implementing a process) to allow for shift on the fly (shifting while the vehicle is moving) between low range and high range and vice versa. At block 906, the determined process is implemented. The process then continues at block 902 monitoring for operator input signals.

EXAMPLE EMBODIMENTS

Example 1 includes a high-low shifting active torque management continuously variable transmission system. The system includes a CVT, a high variable torque limiting clutch and a low variable torque limiting clutch. The CVT includes a primary pulley and a secondary pulley. The primary pulley is in operational communication with an engine to receive engine torque. The high variable torque limiting clutch selectively couples torque between the secondary pulley of the CVT and at least one drive axle of a vehicle when the vehicle is traveling in a high range. The high variable torque limiting clutch is configured to dynamically adjust a slippage threshold of the high variable torque limiting clutch to be above a then current output torque of the CVT and below a then current clamping force generated by the primary pulley and the secondary pulley on a torque connecting endless looped member of the CVT when the high variable torque limiting clutch is activated. The low variable torque limiting clutch selectively couples torque between the secondary pulley of the CVT and the at least one drive axle of the vehicle when the vehicle is traveling in a low range. The low range torque limiting clutch is configured to dynamically adjust a slippage threshold of the low range variable torque limiting clutch to be above the then current output torque of the CVT and below the then current clamping force generated by the primary pulley and the secondary pulley on the torque connecting endless looped member of the CVT when the low range variable torque limiting clutch is activated.

Example 2 includes the system of Example 1, wherein the slippage threshold of the high variable torque limiting clutch and the slippage threshold of the low variable torque limiting clutch are a threshold where adjacent plates in an associated clutch pack of the high variable torque limiting clutch and the low variable torque limiting clutch slip therein limiting the torque passing through the associated high variable torque limiting clutch and low variable torque limiting clutch.

Example 3 includes the system of any of the Examples 1-2, further including a high-low gear set that includes the high variable torque limiting clutch and the low variable torque limiting clutch.

Example 4 includes the system of Example 3, wherein the high-low gear set further includes a carrier and a sun gear. The carrier is coupled to an input shaft to a gearbox. The sun gear is operationally engaged with the carrier. The sun gear is further operationally engaged with the secondary pulley of the CVT.

Example 5 includes the system of any of the Examples 1-4, further including a hydraulic system that is configured to activate the high variable torque limiting clutch and the low variable torque limiting clutch.

Example 6 includes the system of Example 5, wherein the hydraulic system further includes a hydraulic pump and a valve for each of the high variable torque limiting clutch and the low variable torque limiting clutch. Each valve is located in a fluid path between the hydraulic pump and an associated one of the high variable torque limiting clutch and the low variable torque limiting clutch. Each valve is configured to regulate hydraulic pressure delivered to the associated one of the high variable torque limiting clutch and the low variable torque limiting clutch.

Example 7 includes a system of Example 6, further including at least one operator input, a memory, and a controller. The memory is used to at least store operating instructions. The controller is configured to implement the operating instructions stored in the memory. The controller is configured to control each valve based on the stored operating instructions and an operator input signal from the at least one operator input.

Example 8 includes the system of any of the Examples 1-7, further including a forward clutch and a reverse clutch. The forward clutch is operationally positioned between an output of the engine and the primary pulley of the CVT. The forward clutch is configured to be selectively activated. The reverse clutch is operationally positioned between the output of the engine and the primary pulley of the CVT. The reverse clutch is configured to be selectively activated.

Example 9 includes the system of Example 8, further including a forward-reverse planetary gear set that includes the forward clutch and the reverse clutch.

Example 10 includes a vehicle including an active torque management continuously variable transmission system. The vehicle includes an engine to generate torque, a CVT, a high variable torque limiting clutch, and a low variable torque limiting clutch. The CVT includes a primary pulley, a secondary pulley and an endless looped member. The primary pulley is in operational communication with the engine to receive the torque generated by the engine. The endless looped member is engaged with the primary pulley and the secondary pulley to pass the torque between the primary pulley and the secondary pulley. The high variable torque limiting clutch selectively couples the torque between the secondary pulley of the CVT and at least one drive axle of a vehicle when the vehicle is traveling in a high range. The high variable torque limiting clutch is configured to dynamically adjust a slippage threshold of the high variable torque limiting clutch to be above a then current output torque of the CVT and below a then current clamping force generated by the primary pulley and the secondary pulley on the endless looped member when the high variable torque limiting clutch is activated. The low variable torque limiting clutch selectively couples the torque between the secondary pulley of the CVT and the at least one drive axle of the vehicle when the vehicle is traveling in a low range. The low variable torque limiting clutch is configured to dynamically adjust a slippage threshold of the low variable torque limiting clutch to be above the then current output torque of the CVT and below the then current clamping force generated by the primary pulley and the secondary pulley on the endless looped member when the low variable torque limiting clutch is activated.

Example 11 includes the vehicle of Example 10, further including a hydraulic system that is configured to activate the high variable torque limiting clutch and the low variable torque limiting clutch. The hydraulic system included a hydraulic pump, a high valve and a low valve. The high valve is located in a high fluid path between the hydraulic pump and the high variable torque limiting clutch. The high valve is configured to regulate hydraulic pressure delivered to the high variable torque limiting clutch to selectively adjust a torque transfer provided by the high variable torque limiting clutch. The low valve is located in a low fluid path between the hydraulic pump and the low variable torque limiting clutch. The low valve is configured to regulate hydraulic pressure delivered to the low variable torque limiting clutch to selectively adjust a torque transfer provided by the low variable torque limiting clutch. The vehicle further includes at least one operator input, a memory to store at least operating instructions, and a controller. The controller is configured to implement the operating instructions stored in the memory. The controller is configured to control each of the high valve and the low valve at least based on the stored operating instructions and an operator input signal from the at least one operator input.

Example 12 includes the vehicle of Example 11, further including a forward clutch, a forward valve, a reverse clutch and a reverse valve. The forward clutch is operationally positioned between an output of the engine and the primary pulley of the CVT. The forward valve is located in a forward fluid path between the hydraulic pump and the forward clutch. The forward valve is configured to selectively activate the forward clutch. The reverse clutch is operationally positioned between the output of the engine and the primary pulley of the CVT. The reverse clutch is configured to be selectively activated. The reverse valve is located in a reverse fluid path between the hydraulic pump and the reverse clutch. The reverse valve is configured to selectively activate the reverse clutch. The controller is configured to control the forward valve and the reverse valve based on the stored operating instructions and the operator input signal from the at least one operator input.

Example 13 includes the vehicle of Example 12, further including a forward-reverse planetary gear set and a high-low planetary gear set. The forward-reverse planetary gear set includes the forward clutch and the reverse clutch. The high-low planetary gear set includes the high variable torque limiting clutch and the low variable torque limiting clutch.

Example 14 includes the vehicle of any of the Examples 11-13, further including at least one sensor. The controller is configured to control each of the high valve and the low valve based at least in part on sensor signals from the at least one sensor.

Example 15 includes a method of operating a high-low active torque management continuously variable transmission system. The method includes determining a then current output torque of a continuously variable transmission (CVT); determining a then current clamp force of the CVT on an endless looped member; determining a slippage threshold that is less than the current clamp force and higher than the output torque of the CVT; and setting a slip of a high variable torque limiting clutch and a low variable torque limiting clutch that are positioned between the CVT and at least one drive axle of a vehicle based on the slippage threshold.

Example 16 includes the method of Example 15, wherein determining the then current output torque of the CVT further includes monitoring engine revolutions per minute (RPM) and engine torque of an engine of the vehicle; determining a torque and an RPM in a primary pulley based on the engine RPM and the engine torque; determining a ratio of the CVT; and determining an output torque of the CVT based on the determined ratio of the CVT.

Example 17 includes the method of any of the Examples 15-16, wherein the then current clamp force is determined based on the output torque of the CVT, the ratio of the CVT, and a known coefficient of friction between the endless looped member and pulley surfaces.

Example 18 includes the method of any of the Examples 15-17, further including implementing a vehicle mode based on a received operator input signal.

Example 19 includes the method of Example 18, wherein implementing the vehicle mode further includes manipulating valves in a fluid path to one of a forward clutch and a reverse clutch and one of a low variable torque limiting clutch and a high variable torque limiting clutch.

Example 20 includes the method of Example 18, manipulating a high valve in a high fluid path to the high variable torque limiting clutch and a low valve in a low fluid path to the low variable torque limiting clutch in accomplishing a shift on the fly between one of a low range to a high range and a high range to a low range.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A high-low shifting active torque management continuously variable transmission system, the system comprising:
    a continuously variable transmission (CVT) including a primary pulley and a secondary pulley, the primary pulley in operational communication with an engine to receive engine torque;
    a high variable torque limiting clutch selectively coupling torque between the secondary pulley of the CVT and at least one drive axle of a vehicle when the vehicle is traveling in a high range, the high variable torque limiting clutch configured to dynamically adjust a slippage threshold of the high variable torque limiting clutch to be above a then current output torque of the CVT and below a then current clamping force generated by the primary pulley and the secondary pulley on a torque connecting endless looped member of the CVT when the high variable torque limiting clutch is activated; and
    a low variable torque limiting clutch selectively coupling torque between the secondary pulley of the CVT and the at least one drive axle of the vehicle when the vehicle is traveling in a low range, the low variable range torque limiting clutch configured to dynamically adjust a slippage threshold of the low variable range torque limiting clutch to be above the then current output torque of the CVT and below the then current clamping force generated by the primary pulley and the secondary pulley on the torque connecting endless looped member of the CVT when the low variable range torque limiting clutch is activated.

2. The system of claim 1, wherein the slippage threshold of the high variable torque limiting clutch and the slippage threshold of the low variable torque limiting clutch are a threshold where adjacent plates in an associated clutch pack of the high variable torque limiting clutch and the low variable torque limiting clutch slip therein limiting the torque passing through the associated high variable torque limiting clutch and the low variable torque limiting clutch.

3. The system of claim 1, further comprising:
    a high-low gear set that includes the high variable torque limiting clutch and the low variable torque limiting clutch.

4. The system of claim 3, wherein the high-low gear set further comprises:
    a carrier coupled to an input shaft to a gearbox; and
    a sun gear operationally engaged with the carrier, the sun gear further operationally engaged with the secondary pulley of the CVT.

5. The system of claim 1, further comprising:
    a hydraulic system configured to activate the high variable torque limiting clutch and the low variable torque limiting clutch.

6. The system of claim 5, wherein the hydraulic system further comprises:
    a hydraulic pump; and
    a valve for each of the high variable torque limiting clutch and the low variable torque limiting clutch, each valve located in a fluid path between the hydraulic pump and an associated one of the high variable torque limiting clutch and the low variable torque limiting clutch, each valve configured to regulate hydraulic pressure delivered to the associated one of the high variable torque limiting clutch and the low variable torque limiting clutch.

7. The system of claim 6, further comprising:
    at least one operator input;
    a memory to store at least operating instructions; and
    a controller configured to implement the operating instructions stored in the memory, the controller configured to control each valve based on the stored operating instructions and an operator input signal from the at least one operator input.

8. The system of claim 1, further comprising:
a forward clutch operationally positioned between an output of the engine and the primary pulley of the CVT, the forward clutch configured to be selectively activated; and
a reverse clutch operationally positioned between the output of the engine and the primary pulley of the CVT, the reverse clutch configured to be selectively activated.

9. The system of claim 8, further comprising:
a forward-reverse planetary gear set including the forward clutch and the reverse clutch.

10. A vehicle including an active torque management continuously variable transmission system, the vehicle comprising:
an engine to generate torque;
a continuously variable transmission (CVT) including,
a primary pulley in operational communication with the engine to receive the torque generated by the engine,
a secondary pulley, and
an endless looped member engaged with the primary pulley and the secondary pulley to pass the torque between the primary pulley and the secondary pulley;
a high variable torque limiting clutch selectively coupling the torque between the secondary pulley of the CVT and at least one drive axle of the vehicle when the vehicle is traveling in a high range, the high variable torque limiting clutch configured to dynamically adjust a slippage threshold of the high variable torque limiting clutch to be above a then current output torque of the CVT and below a then current clamping force generated by the primary pulley and the secondary pulley on the endless looped member when the high variable torque limiting clutch is activated; and
a low variable torque limiting clutch selectively coupling the torque between the secondary pulley of the CVT and the at least one drive axle of the vehicle when the vehicle is traveling in a low range, the low variable torque limiting clutch configured to dynamically adjust a slippage threshold of the low variable torque limiting clutch to be above the then current output torque of the CVT and below the then current clamping force generated by the primary pulley and the secondary pulley on the endless looped member when the low variable torque limiting clutch is activated.

11. The vehicle of claim 10, further comprising:
a hydraulic system configured to activate the high variable torque limiting clutch and the low variable torque limiting clutch, the hydraulic system including,
a hydraulic pump,
a high valve located in a high fluid path between the hydraulic pump and the high variable torque limiting clutch, the high valve configured to regulate hydraulic pressure delivered to the high variable torque limiting clutch to selectively adjust a torque transfer provided by the high variable torque limiting clutch, and
a low valve located in a low fluid path between the hydraulic pump and the low variable torque limiting clutch, the low valve configured to regulate hydraulic pressure delivered to the low variable torque limiting clutch to selectively adjust a torque transfer provided by the low variable torque limiting clutch;
at least one operator input;
a memory to store at least operating instructions; and
a controller configured to implement the operating instructions stored in the memory, the controller configured to control each of the high valve and the low valve at least based on the stored operating instructions and an operator input signal from the at least one operator input.

12. The vehicle of claim 11, further comprising:
a forward clutch operationally positioned between an output of the engine and the primary pulley of the CVT;
a forward valve located in a forward fluid path between the hydraulic pump and the forward clutch, the forward valve configured to selectively activate the forward clutch;
a reverse clutch operationally positioned between the output of the engine and the primary pulley of the CVT, the reverse clutch configured to be selectively activated;
a reverse valve located in a reverse fluid path between the hydraulic pump and the reverse clutch, the reverse valve configured to selectively activate the reverse clutch; and
the controller configured to control the forward valve and the reverse valve based on the stored operating instructions and the operator input signal from the at least one operator input.

13. The vehicle of claim 12, further comprising:
a forward-reverse planetary gear set including the forward clutch and the reverse clutch; and
a high-low planetary gear set including the high variable torque limiting clutch and the low variable torque limiting clutch.

14. The vehicle of claim 11, further comprising:
at least one sensor, the controller configured to control each of the high valve and the low valve based at least in part on sensor signals from the at least one sensor.

15. A method of operating a high-low active torque management continuously variable transmission system, the method comprising:
determining a then current output torque of a continuously variable transmission (CVT);
determining a then current clamp force of the CVT on an endless looped member;
determining a slippage threshold that is less than the then current clamp force and higher than the then current output torque of the CVT; and
setting a slip torque of a high variable torque limiting clutch and a low variable torque limiting clutch that are positioned between the CVT and at least one drive axle of a vehicle based on the slippage threshold.

16. The method of claim 15, wherein determining the then current output torque of the CVT further comprises:
monitoring engine revolutions per minute (RPM) and engine torque of an engine of the vehicle;
determining a torque and an RPM in a primary pulley based on the engine RPM and the engine torque;
determining a ratio of the CVT; and
determining an output torque of the CVT based on the determined ratio of the CVT.

17. The method of claim 15, wherein the then current clamp force is determined based on an output torque of the CVT, a ratio of the CVT and a known coefficient of friction between the endless looped member and pulley surfaces.

18. The method of claim 15, further comprising:
implementing a vehicle mode based on a received operator input signal.

19. The method of claim 18, wherein implementing the vehicle mode further comprises:
   manipulating valves in a fluid path to one of a forward clutch and a reverse clutch and one of the low variable torque limiting clutch and the high variable torque limiting clutch.

20. The method of claim 18, further comprising:
   manipulating a high valve in a high fluid path to the high variable torque limiting clutch and a low valve in a low fluid path to the low variable torque limiting clutch in accomplishing a shift on the fly between one of a low range to a high range and the high range to the low range.

* * * * *